United States Patent [19]

Okagami et al.

[11] 3,992,166
[45] Nov. 16, 1976

[54] LOW TEMPERATURE STEAM REFORMING PROCESS FOR HYDROCARBONS

[75] Inventors: Akio Okagami, Fuchu; Akio Furuta; Toshikazu Nakamura, both of Yokohama, all of Japan

[73] Assignees: Japan Gasoline Co., Ltd.; Nikki Chemical Co., Ltd., both of Tokyo, Japan

[22] Filed: June 19, 1975

[21] Appl. No.: 588,309

Related U.S. Application Data

[63] Continuation of Ser. No. 424,843, Dec. 14, 1973, abandoned.

[30] Foreign Application Priority Data

Dec. 28, 1972    Japan.............................. 48-001947

[52] U.S. Cl. ............................ 48/214 A; 252/373; 252/443; 252/457; 252/466 J; 252/473
[51] Int. Cl.²...................... C10G 11/28; C01B 2/16
[58] Field of Search .......... 48/214 A; 252/373, 473, 252/443, 457, 465, 466 J; 423/654

[56] References Cited
UNITED STATES PATENTS

| | | |
|---|---|---|
| 2,083,795 | 6/1937 | Schiller et al................... 423/654 X |
| 3,429,680 | 2/1969 | Watanabe............................ 48/214 |
| 3,444,099 | 5/1969 | Taylor et al. ..................... 48/214 X |
| 3,506,418 | 4/1970 | Billings ................................ 48/214 |
| 3,567,411 | 3/1971 | McMahon......................... 48/214 X |
| 3,650,713 | 3/1972 | Chinchen et al...................... 48/214 |
| 3,744,981 | 7/1973 | Ward ................................... 48/214 |
| 3,847,836 | 11/1974 | Nicklin et al. ............... 252/466 J X |

*Primary Examiner*—S. Leon Bashore
*Assistant Examiner*—Peter F. Kratz
*Attorney, Agent, or Firm*—Woodhams, Blanchard & Flynn

[57] ABSTRACT

A process for manufacturing a methane-containing gas, which comprises introducing a hydrocarbon feed material containing hydrocarbons having at least 2 carbon atoms per molecule and steam preheated to a temperature in the range of 250° to 600° C into a steam reforming reactor (or reactors) packed with a catalyst comprising a nickel component and a magnesia component supported on a carrier, and effecting a steam reforming reaction of said hydrocarbons while maintaining the temperature of the catalyst bed of said reactor(s) in the range of 300° to 600° C.

9 Claims, 5 Drawing Figures

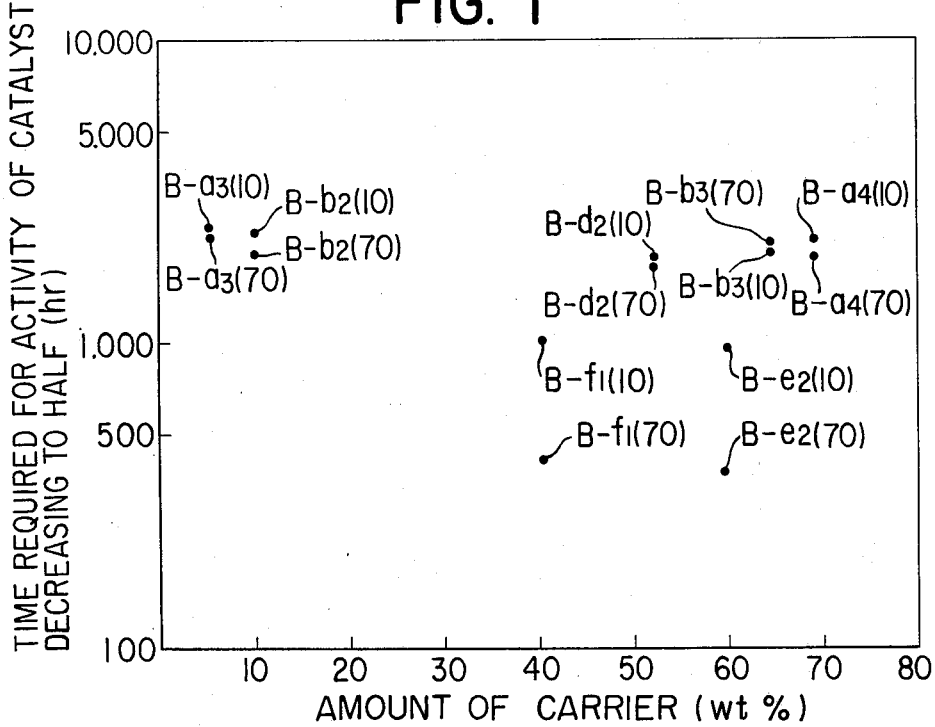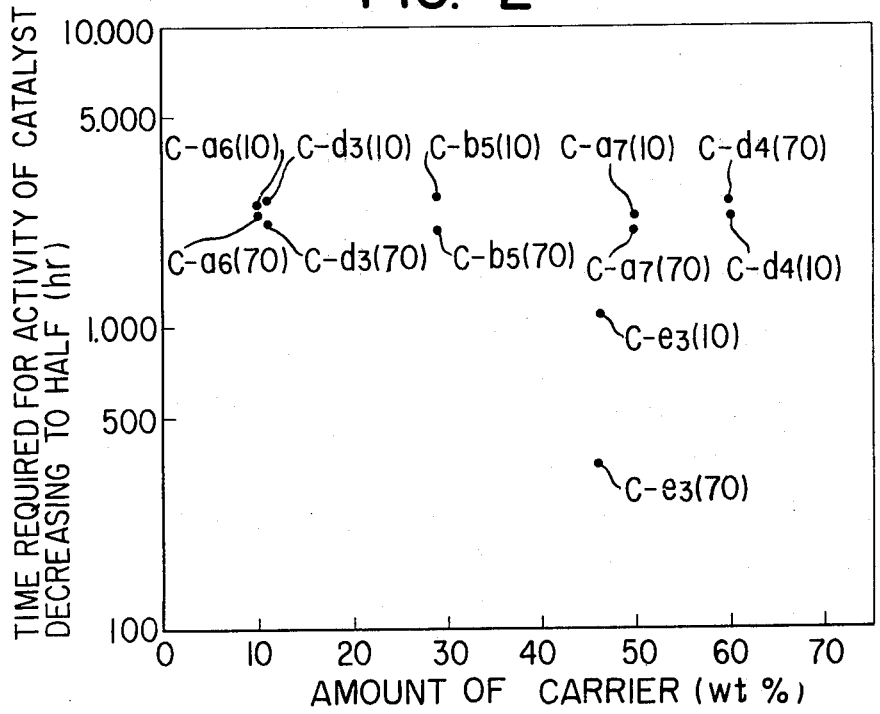

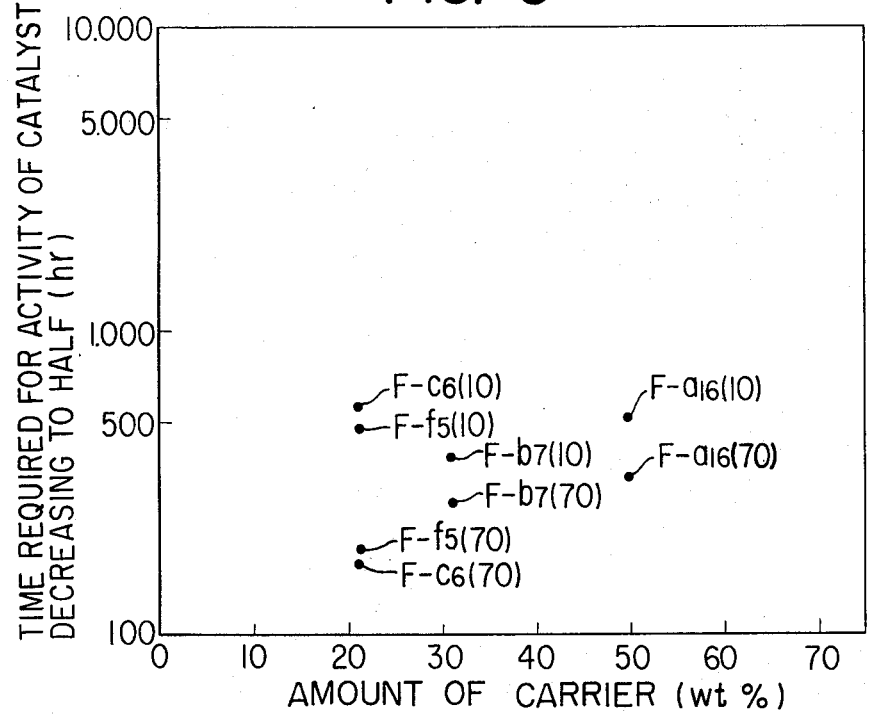

LOW TEMPERATURE STEAM REFORMING PROCESS FOR HYDROCARBONS

This is a continuation of application Ser. No. 424,843, filed Dec. 14, 1973, and now abandoned.

BACKGROUND OF THE INVENTION a. Field of the Invention

The present invention relates to a process of catalytic steam reforming of hydrocarbons having at least 2 carbon atoms per molecule at a temperature in the range of 300° to 600° C, and to be more precise, it relates to a process of manufacturing a methane-containing gas — particularly a methane-rich gas — by, for instance, adiabatically steam reforming feed hydrocarbon(s) in the presence of an improved ternary catalyst comprising a nickel component and a magnesia component supported on a carrier (hereinafter called 'a nickel-magnesia-carrier catalyst' for short) which is capable of demonstrating superior effects in the low-temperature steam reforming reaction.

b. Description of the Prior Art

There have hitherto been proposed a variety of processes of manufacturing a methane-containing gas by subjecting feed hydrocarbon(s) to a low-temperature steam reforming reaction in the presence of a nickel catalyst. To cite instances, there are Japanese Patent Publication No. 11047/1965 teaching the employment of a catalyst consisting of nickel-alumina-lanthanide rare earth, Japanese Patent Publication No. 11048/1965 teaching the employment of a catalyst consisting of nickel-alumina-iron, Japanese Patent Publication No. 19174/1970 teaching the employment of a catalyst consisting of nickel-alumina-alkaline earth metal, and so on.

However, the employment of these conventional catalysts in performing low-temperature steam reforming reaction over a long period of time — particularly a low-temperature steam reforming reaction under the condition of high pressure — has shown a tendency to develop some instable factors such as deterioration of the catalyst, per se, or deposition of carbonaceous matters on the catalyst, etc.

SUMMARY OF THE INVENTION

The present invention relates to a process of manufacturing a methane-containing gas, which comprises introducing a steam reformable hydrocarbon feed material containing hydrocarbons having at least 2 carbon atoms per molecule and steam preheated to a temperature in the range of 250° to 600° C at the ratio of steam to feed in the range of 0.9 to 5.0 in terms of $H_2O/C$ (mole/atom) into a steam reforming reactor (or reactors) packed with a nickel-magnesia-carrier catalyst which has been prepared so that the atomic ratio of nickel to magnesium therein is in the range of 0.5 to 5.0 — preferably 1.0 to 3.0 — and an inorganic refractory carrier free of chemical reaction with associated components during said reforming reaction is contained therein in the amount of not more than 70% by weight relative to the whole amount of said catalyst, and effecting steam reforming reaction of said hydrocarbons by applying a pressure for reaction in the range of 10 to 100 kg/cm².G while maintaining the temperature of the catalyst bed of said reactor(s) in the range of 300° to 600° C, — preferably 400° to 570° C.

BRIEF DESCRIPTION OF THE DRAWING

Referring to the appended drawings, FIG. 1 through FIG. 5 are graphs illustrative of the relation between the amount of the carrier contained in a catalyst and the activity of said catalyst respectively.

DETAILED DESCRIPTION OF THE INVENTION

Figure 3:
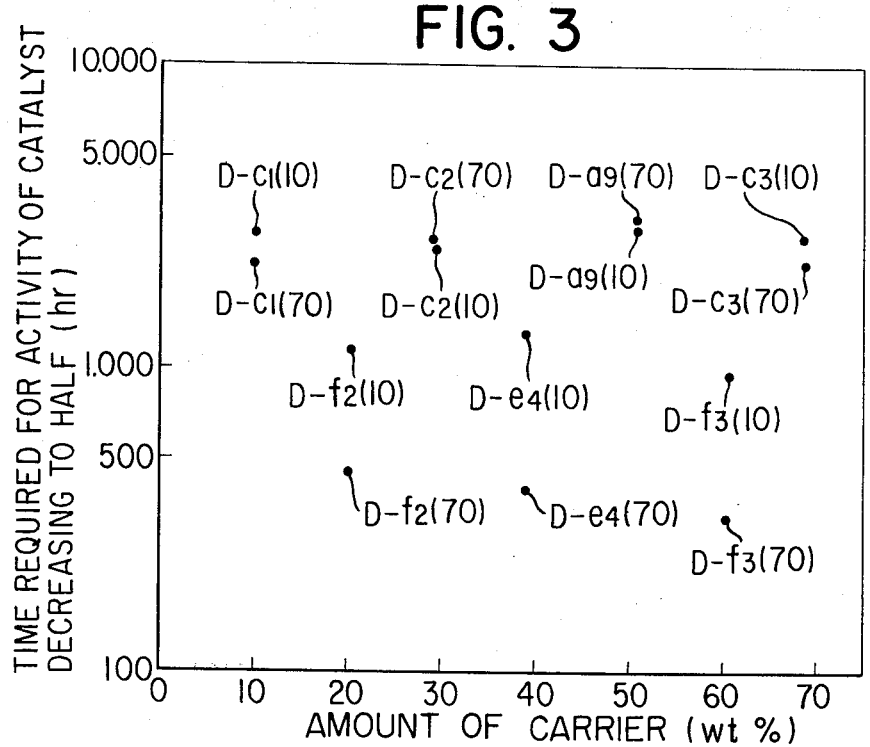

Akio Furuta, one of the inventors of the present invention together with Kiyoshi Morikawa and Hideyuki Matsumoto, has previously proposed in a separate application for patent Ser. No. 417,768, filed Nov. 21, 1973, and now U.S. Pat. No. 3,928,002 a low temperature steam reforming process for hydrocarbons employing a novel nickel-magnesia catalyst capable of effectively controlling the development of such instable factors as mentioned above. After that, the present inventors have continued their studies with a view to improvement of said novel binary catalyst and have discovered further that mixing of a special kind of carrier with said binary catalyst can produce a catalyst having properties equivalent thereto at a low manufacturing cost.

Based on this finding, the present invention has as its object to provide a process of manufacturing a methane-containing gas - particularly a methane-rich gas - by, for instance, adiabatically steam reforming the feed hydrocarbon(s) in the presence of an improved nickel-magnesia-carrier catalyst capable of effectively controlling the development of such instable factors as set forth above. In other words, the low-temperature steam reforming process of the present invention is characterized in that, in the process of manufacturing a methane-containing gas by introducing a hydrocarbon feed material containing hydrocarbons having at least 2 carbon atoms per molecule along with steam preheated to a temperature in the range of 250° to 600° C into a steam reforming reactor (or reactors) packed with a nickel-containing catalyst, and effecting steam reforming reaction of said hydrocarbons while maintaining the temperature of the catalyst bed of said reactor(s) in the range of 300° to 600° C, preferably 400° to 570° C, said reforming reaction being effected in the presence of a nickel-magnesia-carrier catalyst which has been prepared so that the atomic ratio of nickel to magnesium (hereinafter noted as Ni/Mg) therein is in the range of 0.5 to 5.0 - preferably 1.0 to 3.0 -, and not more than 70% by weight of an inorganic heat-resisting carrier free of chemical reaction with associated components during said reforming reaction be contained therein.

The hydrocarbon feed material having at least 2 carbon atoms per molecule to be treated by the process of the present invention include refinery off gas, LPG, light naphtha, heavy naphtha, kerosene, etc. These hydrocarbon(s) feed material are to be introduced into a steam reforming reactor (or reactors) along with steam, and the mixing ratio of steam to said hydrocarbons in terms of $H_2O/C$ on this occasion (to wit, the moles of steam relative to the number of moles of carbon atoms within the material hydrocarbon(s)) is desirable to be in the range of 0.9 to 5.0.

Said Nickel-magnesia-carrier catalyst for use in the process under the present invention may be expressed by Ni-MgO-(carrier) and/or Ni-NiO-MgO-(carrier) when it has been activated through a reduction operation and the MgO therein is an active magnesia which can accelerate said low-temperature steam reforming reaction. As the carrier for this catalyst composition, an inorganic refractory carrier free of chemical reaction with associated components, namely nickel and magnesia, during said reforming reaction is to be employed, and the applicable carriers include, for instance, $\alpha-Al_2O_3$, SiC, $\alpha$-quartz, $ZrO_2$, etc. In this connection, $\gamma-Al_2O_3$, silica gel, kaolin, etc. in wide use as the carrier for the conventional catalysts for low-temperature steam reforming reaction are unfit for use as the carrier for the catalysts of the present invention.

Disregarding the kind of material employed for the carrier, low-temperature steam reforming processes employing a nickel-magnesia-carrier catalyst have already been disclosed in, for instance, Japanese Patent Publication No. 11047/1965 and so on. However, these processes in the prior art are defective in that, the catalysts employed therefor, when used for effecting low-temperature steam reforming reaction at a high pressure, give rise to chemical reaction between alumina contained in the carrier and nickel contained as the active component as well as alkaline earth (e.g., magnesia) contained as the promoter during said reforming reaction, entailing conspicuous deterioration of the activity of catalyst. Therefore, in the case of employing catalysts for low-temperature steam reforming of this kind, it is infeasible to produce a high pressure methane-containing gas by subjecting the hydrocarbons feed material having a pre-elevated pressure to steam reforming under the condition of high pressure. As is generally known, there is every indication nowadays that pipe lines are utilized as a means of supplying a methane-containing gas produced through steam reforming reaction as a substitute for natural gas to consumer districts, and accordingly, said gas is to be transported therethrough under a high pressure. As the method of obtaining a high pressure gas to meet this requirement, there are alternatively a process of elevating the pressure of the gas after manufacturing it, and a process of previously elevating the pressure of liquid hydrocarbon(s) feed material and then producing a high pressure gas by subjecting the thus treated liquid hydrocarbons to steam reforming under high pressure. When compared, the latter process of elevating the pressure of the liquid feed material substance has the merit that the cost required for elevation of the pressure thereof is remarkably lower than that for elevation of the pressure of gaseous substance.

In view of this fact, the present invention is further intended to provide a process of producing a high pressure methane-containing gas at a moderate cost of elevating the pressure of gas such as discussed in the foregoing. In this context, a nickel-magnesia-carrier catalyst according to the present invention is effectively applicable in the case of effecting steam reforming reaction under a pressure for reaction in the range of 10 to 100 $kg/cm^2.G$, and it demonstrates its properties, to wit, high activity and high stability, particularly under the condition of high pressure such as in the range of 30 to 100 $kg/cm^2.G$, Hereunder will be given full particulars of the method of manufacturing the catalyst for use in the process of the present invention and how to effet the steam reforming reaction under the present invention by the use of the resulting catalyst. The method of manufacturing this catalyst, however, is not limited to those described in the following, but the point is that it is capable of producing a nickel-magnesia-carrier catalyst to meet the foregoing requirements of the present invention.

Method of manufacturing catalyst:
[1] Method of manufacturing a catalyst through the co-precipitation process:

An aqueous solution of a nickel salt selected from $Ni(NO_3)_2$, $NiSO_4$, $NiCl_2$, $Ni(CH_3COO)_2$, $Ni(HCOO)_2$ and the like, an aqueous solution of a magnesium salt selected from $MG(NO_3)_2$, $MgSO_4$, $MgCl_2$, $Mg(CH_3COO)_2$, $Mg(HCOO)_2$ and the like, an inorganic refractory carrier selected from $\alpha-Al_2O_3$, SiC, $\alpha$-quartz, $ZrO_2$ and the like as crushed into grains of less than 200 meshe and an aqueous solution of an alkali selected from NaOH, KOH, $Na_2CO_3$, $K_2CO_3$ and the like are admixed so that the ratio of component Ni to component Mg for the resulting catalyst is in the range of 0.5 – 5.0 and the content of the carrier is less than 70 wt. % under the condition of the temperature being in the range of from room temperature to 90° C, preferably 30° to 70° C, thereby precipitating a hydroxide or basic carbonate of Ni and Mg to deposit on said carrier. This liquid mixture is stirred for an appropriate time - for instance, 0.5 to 3 hours - while being held at a temperature as desired, thereby aging said precipitate. The thus aged precipitate is filtered and then washed with a large quantity of water, if desired, hot water. This washing is conducted repeatedly until the washing water after washing becomes practically free of the alkaline matters mixed initially in the form of alkaline aqueous solution, that is to say, until the pH value comes to be in the range of 7 – 9. The thus obtained precipitate is then dried at a temperature in the range of 40° to 130° C, mixed with less than 10 wt. % of a molding assistant such as graphite, stearic acid, etc. and molded into 0.5 to 200 mmxmm $\phi$ tablets by means of a tablet machine. This tablet is calcined at a temperature in the range of 300° to 800° C, preferably 400° to 700° C, whereby a nickel-magnesia-carrier catalyst having the aforesaid ratio of components is obtained.

On this occasion, it is of course possible to subject the undried, wet precipitate to extrusion molding or granulate it by a rolling operation.

[2] Method of manufacturing a catalyst through the wet mixing process - 1:

A commercial active MgO powder for industrial use, the same nickel salt and alkaline aqueous solution as those employed for the foregoing method [1] are admixed under the condition of the temperature being in the range of from room temperature to 90° C - preferably 30° to 70° C and regulating the ratio of component Ni to component Mg for the catalyst to be in the range of 0.5 to 5.0, thereby precipitating a hydroxide or basic carbonate of Ni on the surface of MgO. The thus deposited precipitate is then filtered and washed in the same way as in method [1] and admixed with less than 70 wt. % of the same inorganic refractory carrier as in method [1] as crushed into grains of less than 200 meshes. The resulting mixture is dried, molded and calcined in the same way as in method [1], whereby a nickel-magnesia-carrier catalyst having the aforesaid ratio of components is obtained.

[3] Method of manufacturing a catalyst through the wet mixing process - 2:

The same nickel salt and alkaline aqueous solution as employed for the foregoing method [1] are admixed under the condition of the temperature being in the range of from room temperature to 90° C - preferably 30° to 70° C - so that the ratio of Ni to Mg is in the range of 0.5 to 5.0, thereby precipitating a hydroxide or basic carbonate of Ni and Mg. This precipitate is then subjected to mixing by agitation under a desired fixed condition of temperature as set forth above, followed by filtration and washing under the same condition of operation as in method [1]. The thus treated wet precipitate is admixed with less than 70 wt. % of the same carrier as in method [1] as crushed into grains of less than 200 meshes, and the mixture is dried, molded and calcined in the same way as in method [1], whereby a nickel-magnesia-carrier catalyst having the aforesaid ratio of components is obtained.

Typical methods of manufacturing the catalyst of the present invention are as set forth in the foregoing, and the low-temperature steam reforming process according to the present invention is to be started when a nickel-magnesia-carrier catalyst manufactured by any of the foregoing methods [1] to [3] is packed in a steam reforming reactor (or reactors) and is activated by feeding hydrogen as the reducing gas stream at a temperature in the range of 300° to 600° C - preferably 400° to 500° C - thereto. When said catalyst has been fully activated, feeding of hydrogen is discontinued, a mixture of said hydrocarbon feed material and steam having the mixing ratio in terms of $H_2O/C$ (mole/atom) regulated to be in the range of 0.9 to 5.0 is supplied after preheating it to a temperature in the range of 250° to 600° C, and the steam reforming reaction of said material hydrocarbon(s) is effected while maintaining the temperature of the catalyst bed of said reforming reactor(s) in the range of 300° to 600° C, - preferably 400° to 570° C, whereby a methane-containing gas is produced.

The thus produced methane-containing gas usually contains more than 40% of methane on a dry basis coupled with such associated components as hydrogen, carbon monoxide and carbon dioxide. Therefore, if necessary, it is possible to produce a gas containing much more methane than the above by effecting methanation reaction of carbon oxides, by feeding the gas stream coming out of said reforming reactor(s) to a methanation reactor (or reactors). The resulting methane-containing gas is suited for use as the fuel gas especially.

DESCRIPTION OF THE PREFERRED EMBODIMENTS

Hereunder will be given further particulars of the present invention.

To begin with, 6 varieties of cakes A to F having various ratios of Ni to Mg were prepared by the following processes: Process of preparing the cake A:

Upon preparing a solution by dissolving 870 gr of $Ni(NO_3)_2 \cdot 6H_2O$ and 2560 gr of $Mg(No_3)_2 \cdot 6H_2O$ in 15 l of water, another solution prepared by dissolving 2120 gr of $Na_2CO_3$ in 20 l of water was dripped for mixing therewith over about 1 hour's period at a temperature of 60° C. The precipitate resulting from this mixing was subjected to filtration with a filter, followed by washing with a large quantity of water until the content of Na therein became less than about 0.01 wt. % on a dry basis. The thus obtained cake of precipitate — hereinafter called "cake-A" — was divided equally in 10 parts to serve for preparation of the below-mentioned catalysts. In this connection, when said cake-A was analyzed, the ratio of Ni to Mg therein was 0.33.

Meanwhile, through the same process as in the case of the foregoing cake-A save for modifying the amount of $Ni(NO_3)_2 \cdot 6H_2O$, $Mg(NO_3)_2 \cdot 6H_2O$ and $Na_2CO_3$, various cakes of precipitate, namely, cake-B, cake-C, cake-D, cake-E and cake-F wherein the ratio of Ni to Mg was 0.59, 0.97, 2.88, 4.5 and 5.95, respectively, were prepared.

Subsequently, by combining these cakes A to F with those carriers for catalyst shown in the following Table 1 and calcining each mixture at 450° C, 48 varieties of catalysts were obtained as shown in Table 2 below. In this connection, the carrier materials represented by the symbols a to d in Table 1 are the carriers employed for the present invention, and the carrier materials represented by the symbols e to f in same are the carriers employed for the conventional catalysts.

Table 1

| Symbol for carrier | Carrier | Purity | Surface area | Grain size | Associated components |
|---|---|---|---|---|---|
| a | α-$Al_2O_3$ | 99% (commercial reagent) | 2.8 $m^2/gr$ | less than 200 meshes | |
| b | SiC | 90% (electro-fused product) | 1.0 $m^2/gr$ | '' | $SiO_2$:8%, $Al_2O_3$:1.2%, CaO, MgO, $Na_2O$, $K_2O$, $Fe_2O_3$ |
| c | α-quartz | more than 99% reagent | 2.0 $m^2/gr$ | '' | |
| d | $ZrO_2$ | calcined at 1500° C for 20hrs | 3.6 $m^2/gr$ | '' | |
| e | γ-$Al_2O_3$ | 99% (commercial reagent) | 190 $m^2/gr$ | '' | $Fe_2O_3$:0.02% $SiO_2$:0.02% $Na_2O$:0.02% |
| f | $SiO_2$ gel | 99.5% (commercial reagent) | 600 $m^2/gr$ | '' | $Fe_2O_3$:0.02% $Na_2O$:0.09% |

Table 2

| Symbol for catalyst | A-$a_1$ | A-$a_2$ | A-$b_1$ | A-$d_1$ | A-$e_1$ | B-$a_3$ | B-$a_4$ | B-$a_5$ | B-$b_2$ | B-$b_3$ | B-$b_4$ | B-$e_2$ | B-$f_1$ | B-$d_2$ |
|---|---|---|---|---|---|---|---|---|---|---|---|---|---|---|
| Ni/Mg (molar ratio) | 0.33 | 0.33 | 0.33 | 0.33 | 0.33 | 0.59 | 0.59 | 0.59 | 0.59 | 0.59 | 0.59 | 0.59 | 0.59 | 0.59 |
| Content of carrier (wt. %) | 9.8 | 50.5 | 9.5 | 31.0 | 48.5 | 5.1 | 69.0 | 80.8 | 9.9 | 64.3 | 80.5 | 59.5 | 40.3 | 52 |
| Mixing process | A+a | A+a | A+b | A+d | A+e | B+a | B+a | B+a | B+b | B+b | B+b | B+e | B+f | B+d |

| Symbol for catalyst | B-$d_3$ | C-a | C-$a_7$ | C-$a_8$ | C-$b_5$ | C-$b_6$ | C-$e_3$ | C-$d_3$ | C-$d_4$ | C-$d_5$ | D-$a_9$ | D-$a_{10}$ | D-$c_1$ | D-$c_2$ |
|---|---|---|---|---|---|---|---|---|---|---|---|---|---|---|
| Ni/Mg (molar ratio) | 0.59 | 0.97 | 0.97 | 0.97 | 0.97 | 0.97 | 0.97 | 0.97 | 0.97 | 0.95 | 2.88 | 2.88 | 2.88 | 2.88 |

Table 2-continued

| Content of carrier (wt. %) | 78.8 | 10.0 | 49.5 | 82 | 28.8 | 81 | 46.1 | 10.8 | 59.5 | 80.3 | 50.5 | 80.2 | 9.7 | 28.7 |
|---|---|---|---|---|---|---|---|---|---|---|---|---|---|---|
| Mixing process | B+d | C+a | C+a | C+a | C+b | C+b | C+b | C+d | C+d | C+d | D+a | D+a | D+c | D+c |
| Symbol for catalyst | D-c$_3$ | D-c$_4$ | D-e$_4$ | D-f$_2$ | D-f$_3$ | E-a$_{11}$ | E-a$_{12}$ | E-a$_{13}$ | E-a$_{14}$ | E-e$_5$ | E-f$_4$ | E-d$_6$ | E-d$_7$ | E-d$_8$ |
| Ni/Mg (molar ratio) | 2.88 | 2.88 | 2.88 | 2.88 | 2.88 | 4.5 | 4.5 | 4.5 | 4.5 | 4.5 | 4.5 | 4.5 | 4.5 | 4.5 |
| Content of carrier (wt. %) | 68.5 | 79.8 | 38.8 | 19.8 | 60.3 | 10.8 | 29.5 | 65.9 | 84.1 | 24.8 | 20.3 | 5.3 | 40.4 | 65.3 |
| Mixing process | D+c | D+c | D+e | D+f | D+f | E+a | E+a | E+a | E+a | E+e | E+f | E+d | E+d | E+d |
| Symbol for catalyst | E-d$_9$ | F-a$_{15}$ | F-a$_{16}$ | F-b$_7$ | F-c$_6$ | F-f$_5$ | | | | | | | | |
| Ni/Mg (molar ratio) | 4.5 | 5.95 | 5.95 | 5.95 | 5.95 | 5.95 | | | | | | | | |
| Content of carrier (wt. %) | 80.7 | 30.5 | 49.9 | 31.0 | 21.3 | 21.1 | | | | | | | | |
| Mixing process | E+d | F+a | F+a | F+b | F+e | F+f | | | | | | | | |

EXAMPLE 1

Steam reforming reaction was respectively effected by packing an adiabatic reforming reactor with 15 gr each of 48 varieties of nickel-magnesia-carrier catalysts having the ratio of components as shown in Table 2 above, respectively and supplying thereto the material naphtha with a mean atomic ratio of 6.0 for C and 13.4 for H at the rate of 200 gr/hr, together with steam, by setting the ratio of $H_2O$ to C at 2.0 and under the condition of 500° C as the temperature for reaction and 70 Kg/cm$^2$.G as the pressure for reaction.

After 3 hours' continuous reforming reaction, the amount of the respective product gas coming out of said reforming reactor was measured. The result of this measurement showed that the product gas flowing out of the reforming reactors packed with a catalyst other than the catalyst A-a$_1$, A-a$_2$, A-b$_1$, A-d$_1$, A-e$_1$, B-a$_5$, B-b$_4$, B-d$_3$, C-a$_8$, C-b$_6$, C-d$_5$, D-a$_{10}$, D-c$_4$, E-a$_{14}$ and E-d$_9$ was substantially at the rate of 360 l/hr on a dry basis.

The composition of said product gas on this occasion was practically in the vicinity of 64.8 vol.% of $CH_4$, 12.5 vol.% of $H_2$, 0.44 vol.% of CO and 22.26 vol.% of $CO_2$.

However, in the case of the reforming reactors packed with said catalyst A-a$_1$, A-a$_2$, A-b$_1$, A-d$_1$, A-e$_1$, B-a$_5$, B-b$_4$, B-d$_3$, C-a$_8$, C-b$_6$, C-d$_5$, D-a$_{10}$, D-c$_4$, E-a$_{14}$ and E-d$_9$, there was observed effluence of unreacted naphtha therefrom, and the amount of product gas was very small, so that each test was ended after several tens of hours' operation. In this connection, the result of measurement of the amount of gas produced with the lapse of time when these catalysts were applied was as shown in Table 3 below. As for the method of measurement on this occasion, the gas stream flowing out of said reactor was cooled down to 10° C to divide it into a gaseous matter (comprising the product gas) and a liquid matter (comprising unreacted naphtha and water) and the amount of said gaseous matter was measured.

Table 3

| Symbol for catalyst | Time elapsed (hr) | Amount of product gas (l/hr) | Time elapsed (hr) | Amount of product gas (l/hr) |
|---|---|---|---|---|
| A-a$_1$ | 3 | 118 | 52 | 93 |
| A-a$_2$ | 3 | 73 | 40 | 61 |
| A-b$_1$ | 3 | 134 | 55 | 113 |
| A-d$_1$ | 3 | 90 | 35 | 73 |
| A-e$_1$ | 3 | 91 | 40 | 80 |
| B-a$_5$ | 3 | 120 | 40 | 101 |
| B-b$_4$ | 3 | 123 | 40 | 105 |
| B-d$_3$ | 3 | 115 | 40 | 93 |
| C-a$_8$ | 3 | 133 | 45 | 115 |
| C-b$_6$ | 3 | 141 | 45 | 120 |
| C-d$_5$ | 3 | 139 | 45 | 105 |
| D-a$_{10}$ | 3 | 154 | 40 | 132 |
| D-c$_4$ | 3 | 158 | 40 | 131 |
| E-a$_{14}$ | 3 | 163 | 40 | 128 |
| E-d$_9$ | 3 | 161 | 40 | 130 |

EXAMPLE 2

Steam reforming reaction was effected in the same way as in Example 1 by applying the conditions for reaction that 500° C as the temperature for reaction and 10 kg/cm$^2$.G as the pressure for reaction, and setting the ratio of $H_2O$ to C at 1.5.

When the amount of the product gas 3 hours after the start of reaction was measured in the same way as in Example 1, the result showed that, in the case of the reforming reactors being packed with a catalyst other than the catalysts A-a$_1$, A-a$_2$, A-b$_1$, A-d$_1$, A-e$_1$, B-a$_5$, B-b$_4$, B-d$_3$, C-a$_8$, C-b$_6$, C-d$_5$, D-a$_{10}$, D-c$_4$, E-a$_{14}$ and E-d$_9$, the product gas flowed out of the reactors substantially at the rate of 400 l/hr on a dry basis. The composition of said product gas on this occasion was practically in the vicinity of 55.9 vol.% of $CH_4$, 20.9 vol.% of $H_2$, 1.3 vol.% of CO and 21.9 vol.% of $CO_2$. However, in the case of the reforming reactors packed with said catalysts A-a$_1$, A-a$_2$, A-b$_1$, A-d$_1$, A-e$_1$, B-a$_5$, B-d$_4$, B-d$_3$, C-a$_8$, C-b$_6$, C-d$_5$, D-a$_{10}$, D-c$_4$, E-a$_{14}$ and E-d$_9$, there was observed effluence of unreacted naphtha therefrom, and the amount of product gas was very small, as in Example 1, so that each test was ended after several tens of hours' operation.

Figure 4:
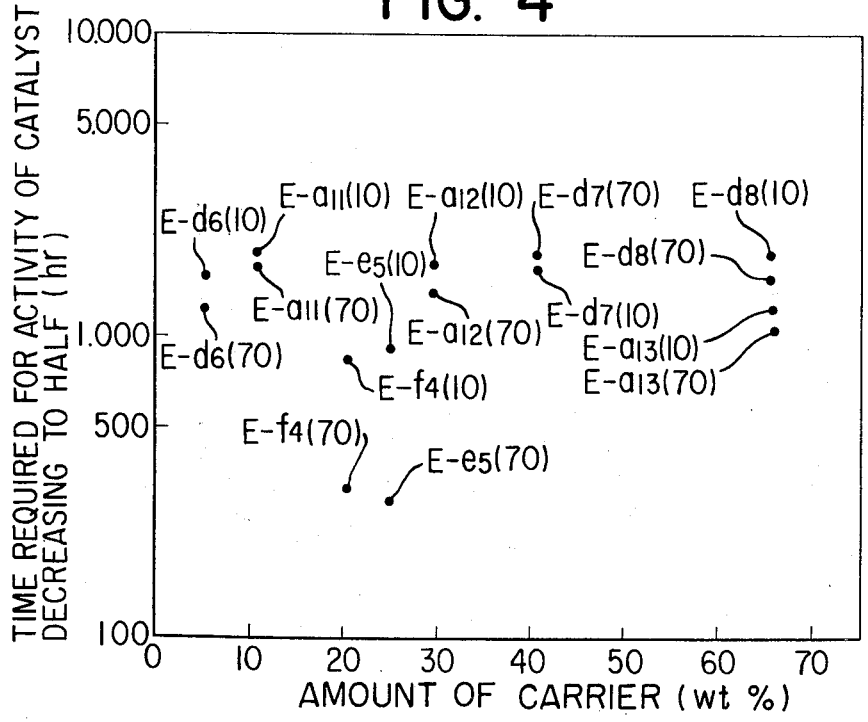

As is clear from the foregoing results of measurements, a catalyst wherein the atomic ratio of Ni to Mg is less than 0.33 or thereabouts and a catalyst wherein the content of carrier is more than 78.8% or thereabouts are possessed of a very little catalytic activity when the temperature for reaction is low, and accordingly, in the case of applying such catalysts to said reforming reaction, there is observed effluence of unreacted naphtha immediately after the start of reaction and the amount of the product gas is very small. On the contrary, the catalysts other than the foregoing proved to have a sufficient catalytic activity immediately after the start of reaction, and therefore, measurement was conducted of the life of these catalysts or the degree of deterioration thereof. The result of measurement in respect of each catalyst was as shown by the graphs in the accompanying FIG. 1 to FIG. 5, wherein the ordinate represents the time (hr) required for the activity of each catalyst to decrease to half while the abscissa represents the content of carrier in each catalyst (wt.%). In these graphs, the notation "B-$a_3$(70)", for instance, signifies the application of the catalyst B-$a_3$ to the process in the foregoing Example 1 (wherein the pressure for reaction = 70 Kg/cm$^2$.G), and "B-$a_3$(10)" signifies the application of the catalyst B-$a_3$ to the process in the foregoing Example 2 (wherein the pressure for reaction = 10 Kg/cm$^2$.G).

Analysis of these graphs reveals that, in the case of a catalyst employing the conventional carrier, such as the catalysts B-$e_2$, B-$f_1$, etc., the time required for the activity of said catalysts to decrease to half is short, and it is extremely short when said catalysts are employed for reaction under the condition of a high pressure (say, 70 Kg/cm$^2$.G). Further, FIG. 5 showing the result of measurement of the catalytic life of catalysts prepared by setting the atomic ratio of Ni to Mg at 5.95 reveals that, even when said catalysts comprise a carrier according to the present invention, the time required for the activity of said catalysts to decrease to half is very short. On the contrary, the other catalysts prepared by employing a carrier according to the present invention and setting the atomic ratio of Ni to Mg to be less than 5.0 prove that the time required for the activity of said catalysts to decrease to half is very long.

The inventors of the present invention have energetically continued their studies of the ratio of components of catalyst applicable to the process under the present invention on the basis of the foregoing results of analysis and they have discovered that it is most effective to choose such catalysts as having a composition wherein the atomic ratio of Ni to Mg is in the range of 0.5 to 5.0, preferably 1.0 to 3.0, and the content of the aforementioned carrier is less than 70 wt.%.

Hereunder will be elucidated the result of their assiduous probe into the reason for occurrence of the differences in catalytic life between the catalyst comprising a carrier according to the present invention and the catalyst comprising a conventional carrier and between the catalyst wherein the atomic ratio of Ni to Mg is more than 5.0 and the catalyst wherein said ratio is less than 5.0 (but not less than 0.5), with reference to Table 4 below showing the result of measurement.

The result of measurement shown in Table 4 represents the numerical values when comparing each catalyst sufficiently activated with hydrogen under the condition of 500° C temperature (hereinafter referred to as 'the catalyst before use') with the same catalyst after serving for the steam reforming reaction in Example 1 (under the condition of 70 Kg/cm$^2$.G pressure) for 1,000 hours and after serving for the steam reforming reaction in Example 2 (under the condition of 10 Kg/cm$^2$.G for 1,000 hours, respectively (hereinafter referred to as "the catalyst after use"). The "MgO effusion ratio (%)" herein represents the numerical value obtained by dividing the amount of effused MgO in the catalyst after use per unit amount of the catalyst by the amount of effused MgO in the catalyst before use per unit amount of the catalyst and multiplied by 100. The "content of carbon (wt.%)" herein represents the numerical value obtained by dividing the content of carbon per unit weight of the catalyst by the amount of said catalyst and multiplied by 100. In this context, the amount of effused MgO was measured by the procedure comprising pulverizing said catalyst into grains of 50 to 100 $\mu$, suspending 10 gr of the resulting grains in 500 cc of water as being continuously fed with carbon dioxide gas of 60 mm-aq., agitating the suspension with an agitator for 2 hours to effuse MgO therein and measuring the weight of the thus effused MgO.

Table 4

| Symbol for catalyst | Condition for reaction | MgO effusion ratio (%) | | Content of carbon (wt.%) | | | Category |
|---|---|---|---|---|---|---|---|
| | | | | | after use | | |
| | | under pressure of 70 Kg/cm$^2$.G | under pressure of 10 Kg/cm$^2$.G | before use | under pressure of 70 Kg/cm$^2$.G | under pressure of 10 Kg/cm$^2$.G | |
| B-$e_2$ | | 63.3 | 82.5 | 0.10 | 8.5 | 4.3 | |
| B-$f_1$ | | 60.5 | 81.8 | 0.20 | 7.7 | 3.1 | |
| C-$e_3$ | | 72.4 | 89.1 | 0.10 | 10.3 | 4.4 | |
| D-$e_4$ | | 68.9 | 82.2 | 0.05 | 14.1 | 5.1 | X |
| D-$f_2$ | | 71.3 | 85.5 | 0.20 | 14.0 | 7.2 | |
| E-$e_5$ | | 60.7 | 90.0 | 0.20 | 15.3 | 6.3 | |
| E-$f_4$ | | 59.8 | 83.5 | 0.13 | 17.1 | 6.2 | |
| B-$a_3$ | | 100 | 100 | 0.05 | 0.07 | 0.05 | |
| B-$a_4$ | | 99.8 | 100 | 0.07 | 0.07 | 0.07 | |
| B-$b_2$ | | 100 | 100 | 0.20 | 0.20 | 0.21 | |
| B-$b_3$ | | 100 | 100 | 0.08 | 0.09 | 0.08 | |
| B-$d_2$ | | 100 | 100 | 0.10 | 0.12 | 0.10 | |
| C-$a_6$ | | 100 | 99.9 | 0.10 | 0.11 | 0.10 | |
| C-$a_7$ | | 99.7 | 100 | 0.05 | 0.05 | 0.05 | |
| C-$b_5$ | | 100 | 100 | 0.05 | 0.05 | 0.05 | |
| C-$d_3$ | | 100 | 100 | 0.10 | 0.12 | 0.11 | |
| C-$d_4$ | | 99.1 | 100 | 0.15 | 0.15 | 0.16 | Y |
| D-$a_9$ | | 99.5 | 100 | 0.11 | 0.13 | 0.11 | |
| D-$c_1$ | | — | — | 0.20 | 0.22 | 0.20 | |
| D-$c_2$ | | — | — | 0.05 | 0.05 | 0.05 | |

Table 4-continued

| Symbol for catalyst | Condition for reaction | MgO effusion ratio (%) | | Content of carbon (wt.%) | | | Category |
| --- | --- | --- | --- | --- | --- | --- | --- |
| | | under pressure of 70 Kg/cm².G | under pressure of 10 Kg/cm².G | before use | after use under pressure of 70 Kg/cm².G | under pressure of 10 Kg/cm².G | |
| D–c$_3$ | | 100 | 100 | 0.10 | 0.13 | 0.10 | |
| E–a$_{12}$ | | — | — | 0.10 | 0.10 | 0.11 | |
| E–a$_{13}$ | | — | — | 0.05 | 0.07 | 0.06 | |
| E–a$_{14}$ | | — | — | 0. | 0.03 | 0.02 | |
| E–d$_6$ | | 100 | — | 0.10 | 0.10 | 0.10 | |
| E–d$_7$ | | 99.7 | — | 0.20 | 0.23 | 0.20 | |
| E–d$_8$ | | 99.7 | 100 | 0.10 | 0.13 | 0.12 | |
| F–a$_{15}$ | | — | — | 0.15 | 10.3 | 4.8 | |
| F–a$_{16}$ | | 99.3 | 99.8 | 0.05 | 11.5 | 5.1 | |
| F–b$_7$ | | — | — | 0.02 | 10.2 | 3.8 | Z |
| F–c$_6$ | | 90.1 | 92.3 | 0.20 | 9.8 | 4.1 | |
| F–f$_5$ | | 89.2 | 93.5 | 0.15 | 10.4 | 4.5 | |

It is to be observed that, in the case of the catalysts comprising a conventional catalyst such as belonging to the category X in Table 4 above, not only is the MgO effusion ratio very small but also the content of carbon in the catalyst after use increases drastically.

The fact that the MgO effusion ratio is so small in this case is considered attributable to a chemical reaction between MgO contained in the catalyst as the promoter and associated components — particularly the carrier component — of the catalyst to take place during said reforming reaction, making MgO insoluble in said aqueous solution of carbonic acid. This MgO as the promoter is considered an important component to accelerate said reforming reaction effectively, that is, to activate water constituting a reacting component and facilitate the reaction with the hydrocarbon(s) feed material. But, this MgO has been deprived of its properties as a result of chemical reaction with the carrier component as stated above. It seems that the catalysts employing a conventional carrier such as belonging to the category X have had their catalytic life remarkably shortened for this reason.

Next, in the case of the catalysts belonging to the category Z in Table 4 wherein the atomic ratio of Ni to Mg is more than 5.0, the content of carbon in the catalyst after use showed a drastic increase. This increase in the content of carbon is considered ascribable to effusion of carbonaceous matters onto the catalyst. And, it seems that the catalysts of the category Z have had their catalytic life remarkably shortened for this reason.

On the contrary, in the case of the catalysts belonging to the category Y in Table 4 according to the present invention, the MgO effusion ratio is 100% or thereabouts, and it has been proved that the content of carbon in the catalyst after use shows little increase. This is considered to be the reason for the catalysts belonging to said category Y according to the present invention having the merit that its catalytic life is very long. Furthermore, in the case of the present nickel-magnesia-carrier catalyst comprising the above described carrier, the cost of manufacturing thereof can be reduced, when occasion demands, to about half the cost of manufacturing of the binary catalyst comprising nickel and magnesia which has previously been proposed as described above.

What is claimed is:

1. In a process for manufacturing a methane-containing gas by subjecting steam-reformable feed hydrocarbon to adiabatic low-temperature steam reforming in the presence of a nickel catalyst, the improvement which comprises preheating a mixture of said feed hydrocarbon with steam mixed in the ratio of moles of steam to the number of moles of carbon atoms in said feed hydrocarbon in the range of 0.9 to 5.0 to a temperature in the range of 250° to 600° C, feeding the preheated mixture into a steam reforming reaction zone containing a catalyst composition consisting of a binary catalyst component of Ni-MgO or Ni-NiO-MgO in which the atomic ratio of nickel to magnesium is in the range of 0.5 to 5.0, said catalyst component being supported on a carrier material selected from the group consisting of $\alpha$-Al$_2$O$_3$, SiC, $\alpha$-quartz, and ZrO$_2$ calcined at 1500° C for 20 hours, said carrier material being from 5.1 to not more than 70% by weight of said total catalyst composition, and effecting steam reforming of said feed hydrocarbon under a pressure in the reaction zone in the range of 10 to 100 kg/cm²G, while maintaining the temperature of said catalyst in the range of 300° to 600° C.

2. A process according to claim 1, in which said hydrocarbon feed material is selected from the group consisting of refinery off gas, LPG, light naphtha, heavy naphtha and kerosene.

3. A process according to claim 1 wherein the hydrocarbon feed material is selected from the group consisting of refinery off gas, LPG, light naphtha, heavy naphtha, and kerosene, the ratio of nickel to magnesium is in the range of 1.0 to 3.0, the pressure in the reaction zone is in the range of 30 to 100 kg/cm²G and the temperature of the catalyst composition is maintained at 400° to 570° C.

4. A process according to claim 1 in which the atomic ratio of Ni to Mg in said catalyst is in the range of 1.0 to 3.0, the pressure in the reaction zone is in the range of 30 to 100 kg/cm²G, and the temperature of the catalyst is in the range of 400° to 570° C.

5. A process according to claim 1, in which said reaction pressure is in the range of 30 to 100 kg/cm².G.

6. A process according to claim 1, in which the temperature of said catalyst bed is maintained in the range of 400° to 570° C.

7. A process according to claim 1, in which the atomic ratio of Ni to Mg in said nickel-magnesia catalyst is in the range of 1.0 to 3.0.

8. A process according to claim 1 in which said carrier material consists of SiC.

9. A process according to claim 1 in which said carrier material consists of $\alpha$-quartz.

* * * * *